United States Patent
Mangal (10) Patent No.: US 8,335,507 B1
(45) Date of Patent: Dec. 18, 2012

(54) DYNAMIC SELECTION OF PRL DEPENDING ON WHETHER SUBSCRIBER IS NEW OR EXISTING

(75) Inventor: Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1331 days.

(21) Appl. No.: 11/484,907

(22) Filed: Jul. 12, 2006

(51) Int. Cl.
*H04W 4/00* (2009.01)

(52) U.S. Cl. .................. 455/432.3; 455/419; 455/432.1; 455/435.2; 455/436; 455/552.1

(58) Field of Classification Search .................. 370/461, 370/466; 455/419, 432.1, 435.2, 436, 552.1
See application file for complete search history.

(56) References Cited

U.S. PATENT DOCUMENTS

| | | | |
|---|---|---|---|
| 6,775,285 B1 * | 8/2004 | Moles et al. | 370/392 |
| 6,859,649 B1 * | 2/2005 | Denenberg et al. | 455/406 |
| 6,876,644 B1 * | 4/2005 | Hsu et al. | 370/338 |
| 2003/0134637 A1 * | 7/2003 | Cooper | 455/432 |
| 2004/0137890 A1 * | 7/2004 | Kalke | 455/418 |
| 2004/0205244 A1 * | 10/2004 | Marsico et al. | 709/245 |
| 2005/0227688 A1 * | 10/2005 | Li et al. | 455/432.1 |
| 2005/0282489 A1 * | 12/2005 | Kamdar et al. | 455/3.02 |

* cited by examiner

*Primary Examiner* — Vladimir Magloire
*Assistant Examiner* — Amanuel Lebassi (57) ABSTRACT

A method and system for provisioning a wireless communication device with a PRL by making a determination of whether the device is being provisioned under an existing subscriber account or rather under a new subscriber account. Based at least in part on the determination, a PRL is selected and the device is provisioned with the selected PRL. In an exemplary embodiment, the invention may enable a wireless carrier to (i) provision a new subscriber's device with a PRL that defines a preference for voice-over-IP (VoIP) service over legacy voice service and/or (ii) provision an existing subscriber's device with a PRL that defines a preference for legacy voice service over VoIP service.

16 Claims, 9 Drawing Sheets

ACQUISITION TABLE

| FREQUENCY | FREQUENCY |
|---|---|
| $FREQ_1$ | $F\text{-}INDEX_1$ |
| $FREQ_1$ | $F\text{-}INDEX_2$ |
| | |

SYSTEM TABLE

| SYSTEM | FREQ - INDEX | PREF | |
|---|---|---|---|
| SID-NID-1 | $F\text{-}INDEX_1$ | 1 | EV-DO |
| SID-NID-2 | $F\text{-}INDEX_2$ | 2 | CDMA 2000 |
| SID-NID-3 | $F\text{-}INDEX_3$ | 3 | CDMA 2000 |
| SID-NID-4 | $F\text{-}INDEX_4$ | 4 | EV-DO |

DYNAMIC SELECTION OF PRL DEPENDING ON WHETHER SUBSCRIBER IS NEW OR EXISTING

FIELD OF THE INVENTION

The present invention relates to telecommunications and, more particularly, to providing wireless telecommunication service to subscribers.

BACKGROUND

Generally speaking, when a wireless carrier distributes wireless communication devices to its subscribers, the carrier will provision each device with a preferred roaming list (PRL), which will indicate an order of preference according to which the device should search for and register with communication systems. In usual practice, the PRL will list as highest priority the carrier's own communication systems (e.g., the carrier's own radio access networks), and the PRL will then list as lower priority other carriers' systems to allow roaming in the event the carrier's systems are not available. Further, within the listing of the carrier's systems, the PRL may prioritize certain types of the carrier's systems over others. For example, if the carrier offers both Wi-Fi and cellular coverage, the PRL might be set to prioritize cellular service over Wi-Fi service. A carrier can initially provision and subsequently change the PRLs in devices in various ways, such as through over-the-air service provisioning or through direct cable connection.

When a carrier rolls out a new type of wireless communication service, the carrier often needs to configure its radio network infrastructure to support the new service. Such configuration typically involves providing sufficient infrastructure elements and programming to be able to serve the new wireless communication service to an expected population of subscribers. That is, the carrier generally needs to ensure that its radio access networks are configured with sufficient capacity to support the carrier's current and new subscribers. Failure to provide sufficient capacity for the subscriber population can result in degradation of service quality for the subscribers, in terms of communication speeds, clarity, or the like.

SUMMARY

The present invention is directed to methods and systems for dynamically selecting a preferred roaming list (PRL) for a wireless communication device (WCD) depending on whether the WCD is being provisioned under a new subscriber account or rather under an existing subscriber account. If the WCD is being provisioned under an existing subscriber account, a first PRL may be selected for the WCD. However, if the WCD is being provisioned under a new subscriber account, a second PRL may be selected for the WCD. The first and second PRL may differ in the communication systems and services listed therein. Instead or in addition, the first and second PRL may differ in the relative priority assigned to various communication systems and services. In any event, by virtue of the present invention, new subscribers and existing subscribers may be granted access to different sets of systems and services.

In one respect, an exemplary embodiment of the invention may take the form of a method. In accordance with the method, a determination of whether the WCD is being provisioned under an existing subscriber account or rather under a new subscriber account is made. A PRL is selected based at least in part on the determination. The WCD is then provisioned with the selected PRL.

These as well as other aspect and advantages will become apparent to those of ordinary skill in the art by reading the following detailed description with reference to the accompanying drawings.

BRIEF DESCRIPTION OF THE DRAWINGS

Exemplary embodiments of the invention are described herein with reference to the following drawings, in which like numerals denote like entities.

DETAILED DESCRIPTION OF EXEMPLARY EMBODIMENTS

I. Overview

The present invention is generally directed to provisioning a wireless communication device (WCD) with a preferred roaming list (PRL). The PRL may include a prioritized listing of communication systems and/or services that the WCD is allowed to use while communicating with other devices and/or systems. Further, along with the prioritized listing of communication systems and/or services, the PRL may indicate particular air interface protocols that the WCD may use while communicating with the listed communication systems.

Figure 1:
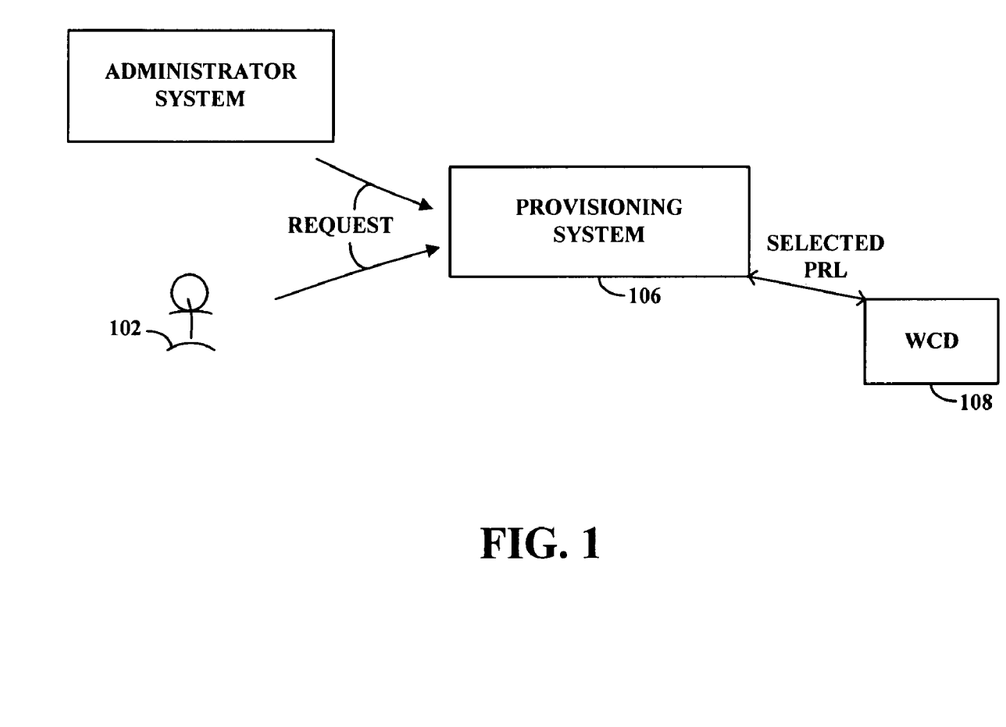
FIG. 1 is a simplified block diagram of an exemplary communication system, in which a wireless communication device (WCD) may be provisioned in accordance with exemplary embodiments.

As shown in FIG. 1, provisioning the WCD with the PRL may be carried out by a provisioning system 106. As an example, provisioning system 106 could be a computer system located at a service center, which may be a point of purchase, such as a retail outlet store, at which a customer may purchase WCD 108. As another example, the service center could be a repair center to which a customer may bring his or her WCD 108 to be fixed by a technician. As another example, provisioning system 106 could include one or more network entities that could cooperate to provision a WCD 108 with a PRL either over the air or through a direct cable connection.

Provisioning WCD 108 with a PRL may be triggered by provisioning system 106 receiving a request to provision WCD 108. The request may originate from a customer service representative 102 operating provisioning system 106 at a service center. As another example, the request may originate from a network device, such as an administrator system 104, which may be programmed to send a request to provisioning system 106. After receiving the request, provisioning system 106 may select a PRL.

Figure 2:
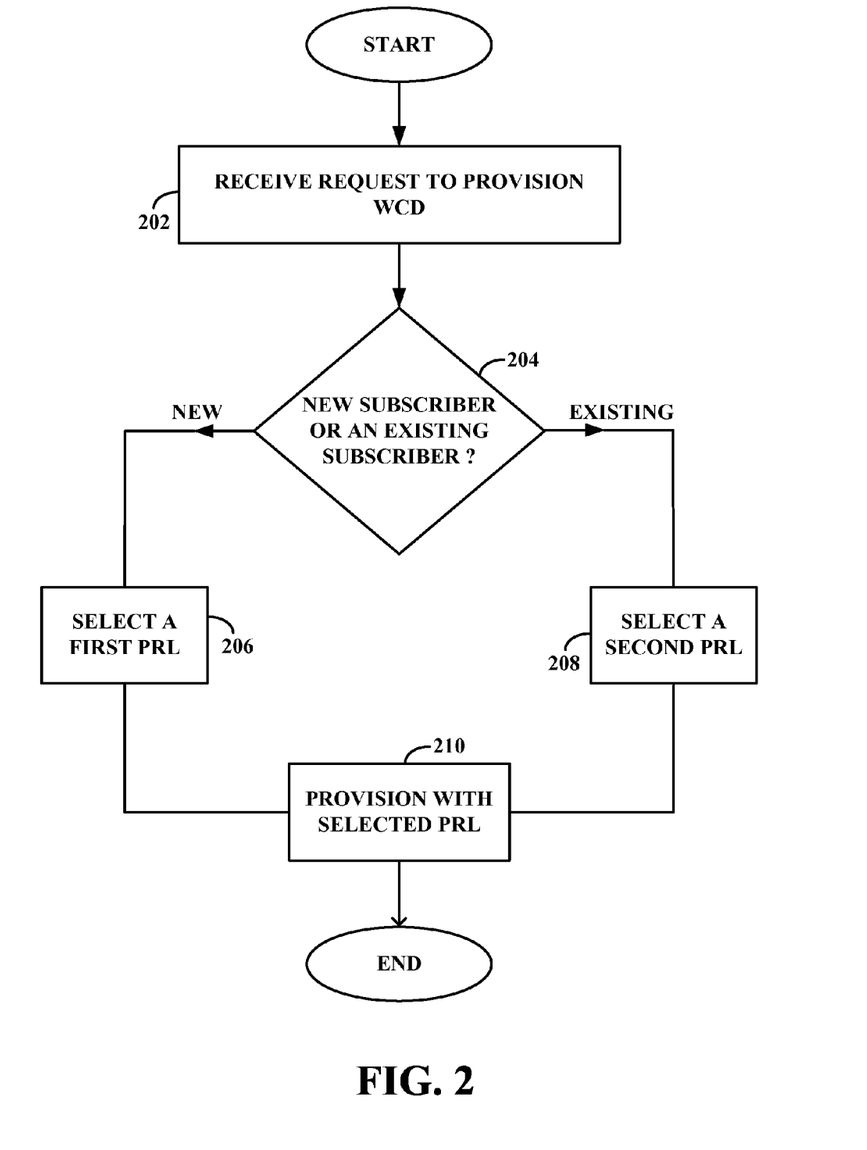
FIG. 2 is a flowchart of an exemplary embodiment, in the form of method carried out along the communication system of FIG. 1.

As shown in FIG. 2, once provisioning system 106 receives a request to provision WCD 108 at step 202, provisioning system 106 will make a determination at step 204 as to whether WCD 108 is being provisioned under a new subscriber account or rather under an existing subscriber account. If the determination at step 204 is that WCD 108 is being provisioned under a new subscriber account, then, at step 206, provisioning system 106 will select a first PRL. Alternatively, if the determination at step 204 is that WCD 108 is being provisioned under an existing subscriber account, then, at step 208, provisioning system 106 will select a second PRL. In some embodiments, in addition to making the determination at step 204, provisioning system 106 may also identify a home service area of WCD 108 and base its selection of a PRL for WCD 108 not only on the determination made at step 204, but also on the identified home service area, and perhaps on other factors as well. Once provisioning system 106 has selected a PRL at either step 206 or step 208, provisioning system 106 will, at step 210, provision WCD 108 with the selected PRL.

As noted above, at step 204, provisioning system 106 makes a determination of whether WCD 108 is being provisioned under a new subscriber account or rather under an existing subscriber account. There are many ways in which this determination can be made, some of which may involve provisioning system 106 accessing a subscriber account record to make this determination.

The subscriber account record may store a subscriber's personal information along with data that associates WCD 108 with that subscriber's account. As examples, the subscriber account record may store the subscriber's name, date of birth, personal identification number, payment information (such as credit card information), a mobile identification number (MIN) that serves as the subscriber's directory telephone number, an Electronic Serial Number (ESN) that identifies WCD 108 as a unique physical device, and any other type of information that associates the subscriber with WCD 108.

When accessing a given subscriber account, provisioning system 106 may determine whether the account is associated with a new subscriber or with an existing subscriber. A new subscriber may be a new customer activating service for the first time. In this case, customer service representative 102 may create a new subscriber account for the new customer. In contrast, an existing subscriber may be a returning customer who has had a WCD other than WCD 108 associated with their subscriber account and would now like to associate an additional and/or replacement WCD, such as WCD 108, with that existing subscriber account. In this case, customer service representative 102 may update the existing subscriber account with WCD 108's ESN. If this provisioning process involves replacing some other WCD's ESN with WCD 108's ESN in the subscriber account, the process may be referred to as involving an "ESN-swap".

In one embodiment, provisioning system 106 may make the determination of step 204 by accessing the subscriber account and determining whether at least one WCD (i.e. ESN) is already associated with that subscriber account. If the subscriber account does not have an ESN associated with it, then the subscriber account may be deemed to be a new subscriber account. Alternatively, if the subscriber account has an ESN already associated with it, then the subscriber account may be deemed to be an existing subscriber account.

In another embodiment, provisioning system 106 may make the determination of step 204 by checking an activation date for a subscriber account. The activation date may be the date on which a subscriber activated service for WCD 108 or for some other WCD. Thus, if the activation date is earlier than a certain date, then the subscriber account associated with WCD 108 may be deemed to be an existing subscriber account. However, if the activation date is later than the certain date, then the subscriber account may be deemed to be a new subscriber account. A sequentially or systematically assigned subscriber-account could be compared with a threshold account number in a similar manner.

In yet another embodiment, the determination at step 204 may involve determining if the subscriber account has a billing account associated with it. A plurality of subscriber accounts may be associated with a single billing account. The billing account may be an account that facilitates payment—perhaps by credit card, automatic withdrawal, or mail—for services provided to subscriber accounts associated with the billing account. Thus, in this embodiment, a new subscriber account may be one that does not yet have an associated billing account. In this case, a billing account may need to be created, which could be done at a service center by customer representative 102. Alternatively, the subscriber account that is associated with WCD 108 may be associated with an existing billing account. Because the subscriber account is associated with an existing billing account, provisioning system 106 may deem the subscriber account to be an existing subscriber account. Many other examples are possible as well with respect to how the determination may be made as to whether WCD 108 is being provisioned under a new subscriber account or under an existing subscriber account.

As noted above, once the determination is made as to whether WCD 108 is being provisioned under a new subscriber account or under an existing subscriber account, a PRL may be selected either at step 206 or step 208. WCD 108 will then be provisioned with the selected PRL.

Figure 3:
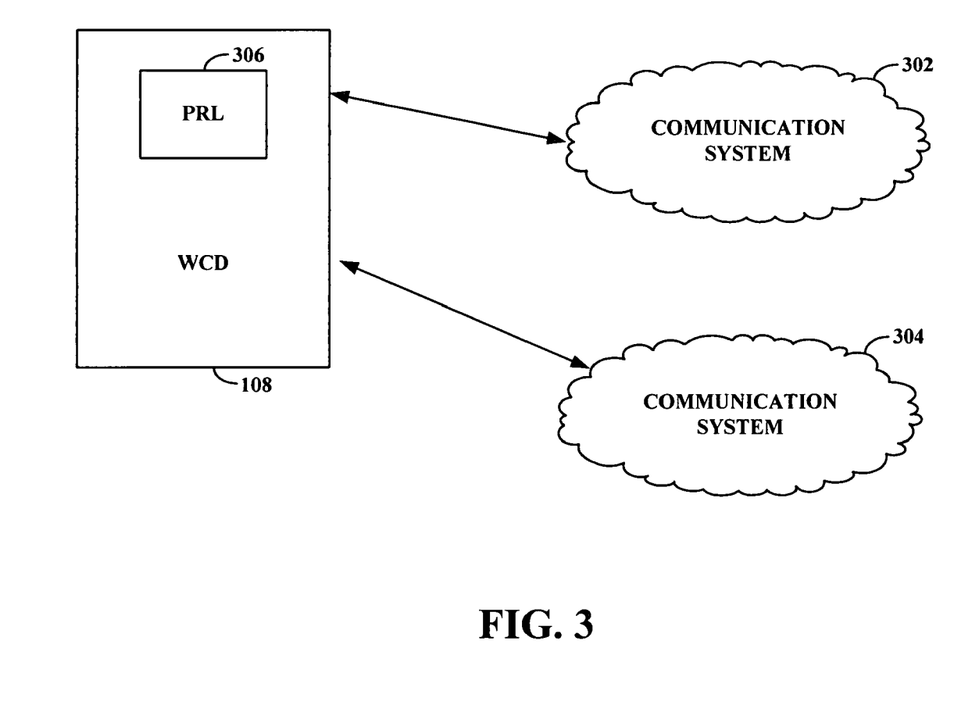
FIG. 3 is a simplified block diagram of an exemplary communication network, in accordance with exemplary embodiments.

As shown in FIG. 3 as an example, once WCD 108 has been provisioned with a PRL 306, WCD 108 may communicate with a communication system 302 and/or a communication system 304. Communication system 302 and communication system 304 may each be uniquely identified by a combination of System Identification Code (SID), Network Identification Code (NID), and Radio Frequency. For instance, one or more Radio Access Networks (RANs) may broadcast different SID and NID codes for each of the communication systems 302 and 304. The order in which WCD 108 attempts to access either or both communication systems may be dictated by PRL 306. As an example, PRL 306 may prefer communication system 302 over communication system 304. As another example, PRL 306 may allow WCD 108 to communicate with communication system 302 but not with communication system 304. Other examples are possible as well.

Figure 4:
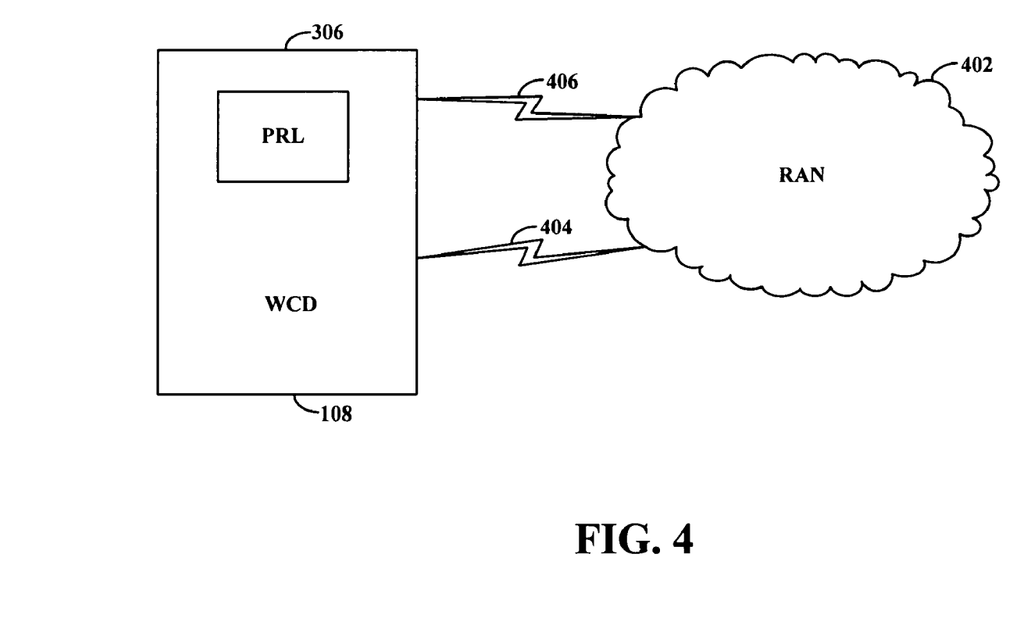
FIG. 4 is another simplified block diagram of an exemplary communication network, in accordance with exemplary embodiments.

FIG. 4 shows another exemplary scenario involving WCD 108, once WCD 108 has been provisioned with PRL 306. As shown in FIG. 4, WCD 108 may communicate with a RAN 402 either over an air interface 404 or an air interface 406. Communication over air interfaces 404 and 406 may each be carried out according to a respective air interface protocol such as Code Division Multiple Access (CDMA). One such format is cdma2000® described in "CDMA 2000® Series," TIA/EIA/IS-2000 Series, Rev. A (March 2000), which is incorporated herein by reference. Another example of a CDMA format is the well-known EV-DO Rev. A, which is incorporated herein by reference. Other examples of air interface protocols are also possible. These include but are not limited to the Global System for Mobile Communication (GSM) protocol and/or one or more Time Division Multiple Access (TDMA) protocols.

The order in which WCD 108 attempts to use an air interface protocol to communicate with RAN 402 may be dictated by PRL 306. As an example, PRL 306 may prefer communication with RAN 402 to occur on air interface 406 rather than on air interface 404. As another example, PRL 306 may allow WCD 108 to communicate with RAN 402 over air interface 404 and not over air interface 406. And other examples are possible as well.

As an exemplary use of the present invention, consider a scenario where a carrier rolls out a new communication service. The carrier may make the service available for use by new subscribers but not for existing subscribers. In a preferred embodiment, the carrier will do this by provisioning PRLs. In particular, the carrier may provision a new subscriber's PRL to allow the communication service, and the carrier may provision an existing subscriber's PRL to not allow the communication service.

Further, the present invention may be useful in a scenario where a carrier rolls out a new form of voice communication service, especially if the roll-out is (entirely or mostly) transparent to its subscribers, but still requires a system upgrade to support the new service. With the roll-out being transparent to subscribers, the fact that the carrier may allow only new subscribers to use the service and may leave existing subscribers to use the old service should not upset the existing subscribers. Yet it can benefit the carrier, since the carrier can gradually roll out the new service, first making it available to new subscribers and then perhaps making it available to existing subscribers.

As an example, one such scenario could involve a roll-out of voice-over-IP (VoIP) service that is planned to eventually replace legacy voice service, which may be any voice service that does not involve packet-switched voice service. In particular, a carrier may roll out VoIP service that allows VoIP-equipped handsets to place and receive voice calls over IP, functioning as full IP terminals (e.g., with SIP and RTP/IP functionality), possibly making use of the EV-DO Rev. A protocol.

From a user's perspective, the process of placing or receiving VoIP calls may appear no different than the process of placing or receiving legacy voice calls, so the user may not have a preference as to whether the call is placed as a VoIP call or as a legacy call. However, rolling out the new VoIP service may require significant upgrades to the carrier's infrastructure. The present invention can be particularly useful in that scenario, as it can allow the carrier to perform just a partial upgrade, sufficient to serve new subscribers with VoIP service, while leaving its legacy infrastructure to serve the existing subscriber population with legacy service, which the legacy infrastructure was already able to handle.

In accordance with one embodiment of the invention, a wireless carrier may provide at least two types of communication service, such as a CDMA2000 service and an EV-DO Rev. A service. With the CDMA2000 service, wireless handsets may acquire packet-data connectivity for data communications, but use legacy circuit-switched techniques for placing and receiving voice calls. With the EV-DO Rev. A service, wireless handsets may use packet-data connectivity for both data communications and voice calls, with further network infrastructure in place to support VoIP service.

In this embodiment, a handset provisioning system (which may be over-the-air or directly-connected) will select a PRL to provision on a subscriber's handset based on whether the subscriber is a new subscriber or an existing subscriber. If the subscriber is a new subscriber, the provisioning system may provision the handset with a PRL that gives higher priority to VoIP service than to legacy service, or that allows VoIP service and precludes legacy service. On the other hand, if the subscriber is an existing subscriber, the provisioning system may provision the handset with a PRL that gives higher priority to legacy service than to VoIP service, or that allows legacy service and precludes VoIP service.

Furthermore, in accordance with another aspect of the invention, the decision of which PRL to provision on a given handset could also be based on where the given handset's home service area is, i.e., the home service location of the handset. For instance, if VoIP voice service has been rolled out extensively in a given market, then a handset having its home service in that market could be provisioned with a PRL that prefers VoIP over legacy voice service even if the handset is being provisioned under an existing subscriber account. On the other hand, if VoIP service has been rolled out only slightly in a given market, then a handset having its home service in that market could be provisioned with a PRL that prefers legacy voice service even if the handset is being provisioned under a new subscriber account.

II. Exemplary Architecture

This section contains descriptions for FIGS. 5, 6, 7, and 8. It should be understood, however, that the arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination or location.

a. Exemplary Wireless Communication Device (WCD)

Figure 5:
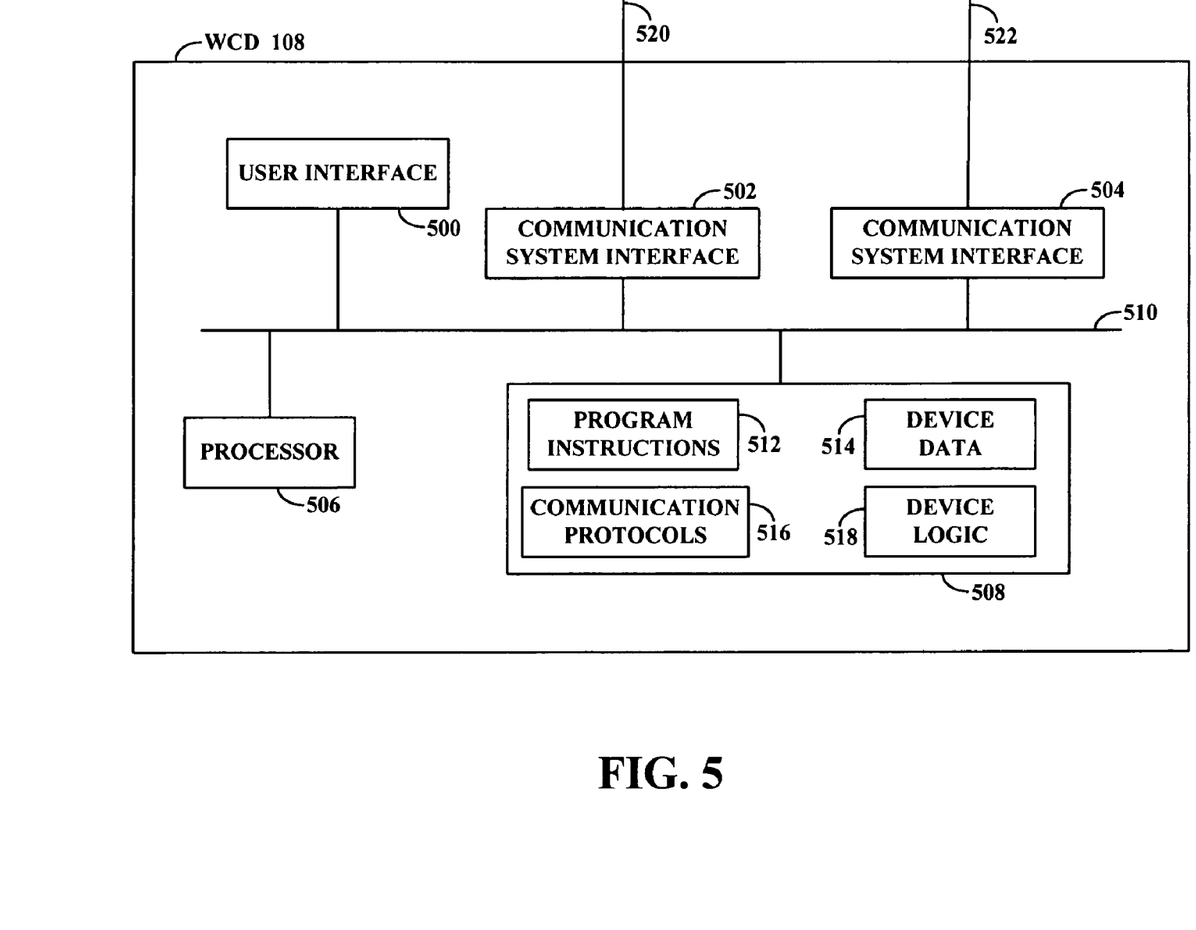
FIG. 5 is a simplified block diagram of an exemplary WCD, which may be used in accordance with exemplary embodiments.

FIG. 5 is a simplified block diagram of an exemplary WCD, which may be used in accordance with exemplary embodiments. In particular, FIG. 5 depicts WCD 108 of FIG. 1. As examples, WCD 108 may be a cellular phone, a PDA, or a laptop computer. Other examples are also possible. As shown in FIG. 5, WCD 108 includes a user interface 500, a first communication system interface 502, a second communication system interface 504, a processor 506, and data storage 508, all of which may be communicatively linked by a system bus 510. Further, WCD 108 may include any other mechanisms now known or later developed for such devices. In this example, WCD 108 is a multi-mode cellular phone, able to communicate with wireless networks using more than one type of protocol, such as any combination of CDMA2000, EV-DO, and IEEE 802.11.

User interface 500 includes one or more mechanisms for receiving inputs from users and one or more mechanisms for communicating outputs to users. Cell phone user interfaces are known in the art, and thus are not described in detail here. Suffice it to say that user interface 500 may include buttons, a touch screen, a microphone, and any other mechanisms now known or later developed for receiving inputs, as well as an LCD or other display, speakers, and any other mechanisms now known or later developed for communicating outputs.

Communication system interface 502 may be a chipset arranged to communicate over an air interface with a communication system such as communication system 302 according to a protocol such as CDMA2000. This chipset may interface with an antenna 520 to facilitate communication with communication system 302.

Communication system interface 504 may be a chipset arranged to communicate over an air interface with a communication system such as communication system 304 according to a protocol such as EV-DO Rev. A. This chipset may interface with an antenna 522 to facilitate communication with communication system 304.

It should be understood that communication interfaces 502 and 504 may share a common antenna. Further, the two interfaces may be integrally formed, or may in fact be a single interface, such as a single chipset capable of communication with both communication systems 302 and 304.

Processor 506 may control many operations of WCD 108 by executing a set of program instructions 512 stored in data storage 508, and may comprise multiple (e.g. parallel) processors, such as a general purpose microprocessor and/or a discrete digital signal processor.

Data storage 508 may store program instructions 512, device data 514 (described below in connection with FIG. 6), communication protocols 516, and device logic 518. Further, data storage 508 may take various forms, in one or more parts, such as a non-volatile storage block and/or a removable storage medium. Program instructions 512 may be executable by processor 506 to carry out various WCD functions described herein. Communication protocols 516 may be used by WCD 108 to communicate with other devices using communication system interface 502 and/or 504. Device logic 518 may be executable by processor 506 to manage aspects of WCD 108 such as memory and file management.

Figure 6:
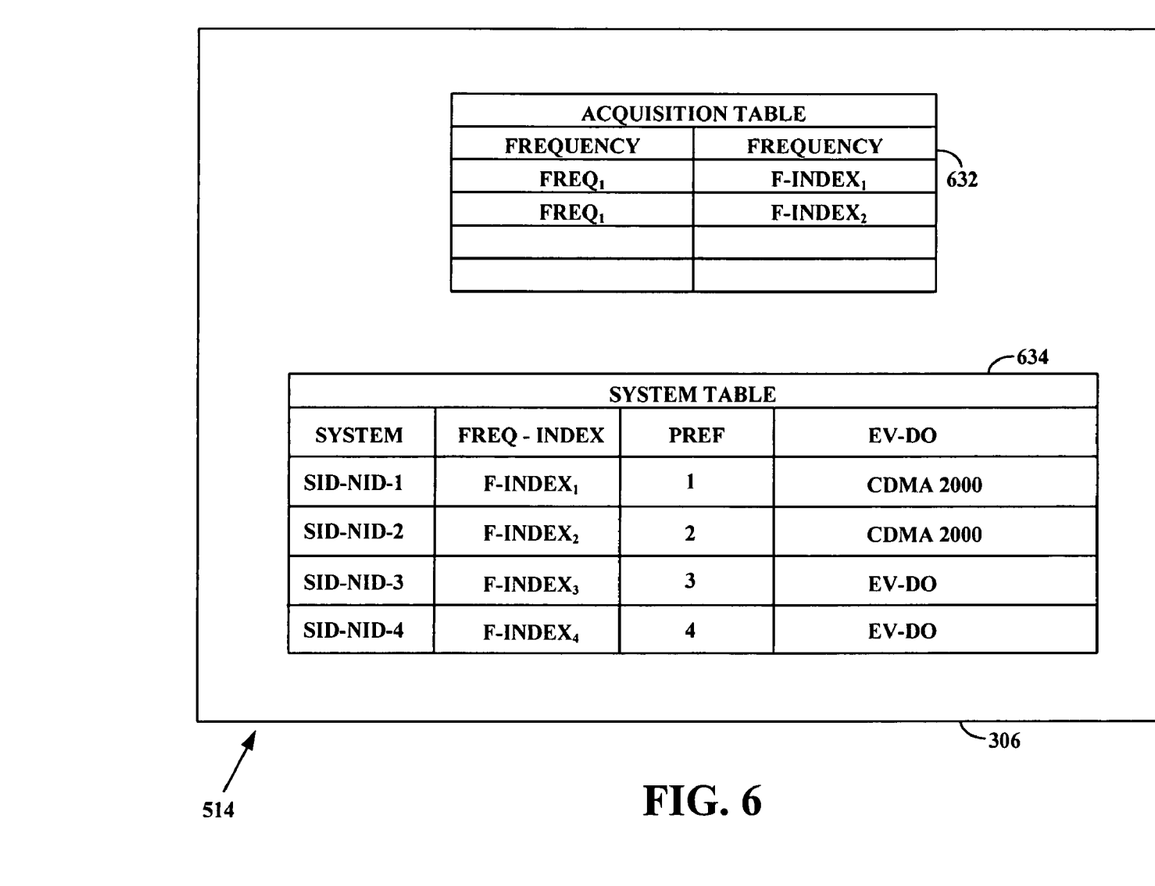
FIG. 6 is simplified block diagram of an exemplary set of data that may be stored by a WCD, in accordance with exemplary embodiments.

FIG. 6 is a simplified block diagram of an exemplary set of data that may be stored by WCD 108, in accordance with exemplary embodiments. In particular, FIG. 6 is a diagram of exemplary data that may be stored as device data 514 of FIG. 5. As shown in FIG. 6, device data 514 may comprise preferred roaming list (PRL) 306 of FIG. 3. In addition to PRL 306, device data 514 may comprise one or more other types of data. Furthermore, device data 514 could take other forms and be stored among multiple storage media, as the arrangement depicted by FIG. 5 is exemplary in nature.

It should be understood that a PRL can take any of a variety of forms. By example, a rudimentary PRL may take the form of a simple listing or data table in which each entry corresponds with a respective system and indicates a radio frequency and system/network identifier for the system.

More typically, as shown in FIG. 6, PRL 306 includes two tables: an acquisition table 632 and a system table 634. Acquisition table 632 lists a number of carrier frequencies, $FREQ_1$, $FREQ_2$, ..., $FREQ_n$, on which allowed communication systems operate and specifies a frequency index number respectively for each frequency. System table 634, in turn, lists allowed communication systems in a priority search order, i.e., in an order in which WCD 108 is to search for each communication system until the device is able to connect to one.

As shown more particularly in FIG. 6, each row of system table 634 corresponds with a respective communication system and includes a number of columns or fields that designate parameter values or attributes of the system. In this example, the first parameter values for each system are a SYSTEM ID/NETWORK ID (SID_NID), and a FREQUENCY INDEX, with the FREQUENCY INDEX corresponding with a carrier frequency listed in the acquisition table 632. (In this example, all systems have the same frequency.)

Cooperatively, these three values uniquely identify each communication system in the exemplary PRL 306 and allow WCD 108 to detect the presence of any of the communication systems. In particular, for each communication system, a RAN may emit a pilot signal on the designated carrier frequency, and the pilot signal may carry the SID and NID of the system. Thus, by scanning the airwaves on a specific frequency, WCD 108 can receive and resolve a pilot signal, determine that the pilot signal carries a particular SID/NID combination, and conclude that the pilot signal denotes the presence of a specific communication system.

PRL 306 lists allowed communication systems in a specific priority order (indicated by a PREF value in the system table), which defines the default order in which WCD 108 is to attempt to connect to an available communication system from among those listed. The communication systems may be listed according to a geographic preference or according to services that the systems offer.

Applying the basic PRL as shown, for instance, WCD 108 will first scan the airwaves in search of a pilot from the first listed system, SID_NID_1, and if the WCD does not find that system, it will then search the airwaves in search of a pilot from the next listed system, SID_NID_2. The WCD will continue in this manner until it finds a system with which it is able to connect or until it exhausts the list. Once the WCD finds a system, the WCD may register with the system. Further, upon finding a system or exhausting the list, the WCD may then repeat the process, beginning once again by searching for the first (highest priority) system on the list.

Turning again to FIG. 5, communication protocols 516 may include one or more CDMA protocols such as cdma2000® and/or EV-DO Rev. A, one or more TDMA protocols, Advanced Mobile Phone Service (AMPS), GSM, HyperText Transfer Protocol (HTTP), Session Initiation Protocol (SIP), Real-Time Transport Protocol (RTP), Transmission Control Protocol (TCP), User Datagram Protocol (UDP), Internet Protocol (IP), Simple Mail Transfer Protocol (SMTP), Dynamic Host Configuration Protocol (DHCP), Domain Name Service (DNS), Internet Control Message Protocol (IMCP), Point-to-Point Protocol (PPP), IEEE (Institute of Electrical and Electronics Engineers) 802.11x, Bluetooth®, HiperLAN, Multichannel Multipoint Distribution Service (MMDS), HomeRF, one or more proprietary protocols, and/or one or more other protocols. Compatible protocols may be stored in other entities in communication with WCD 108.

b. Exemplary Communication Systems

Figure 7:
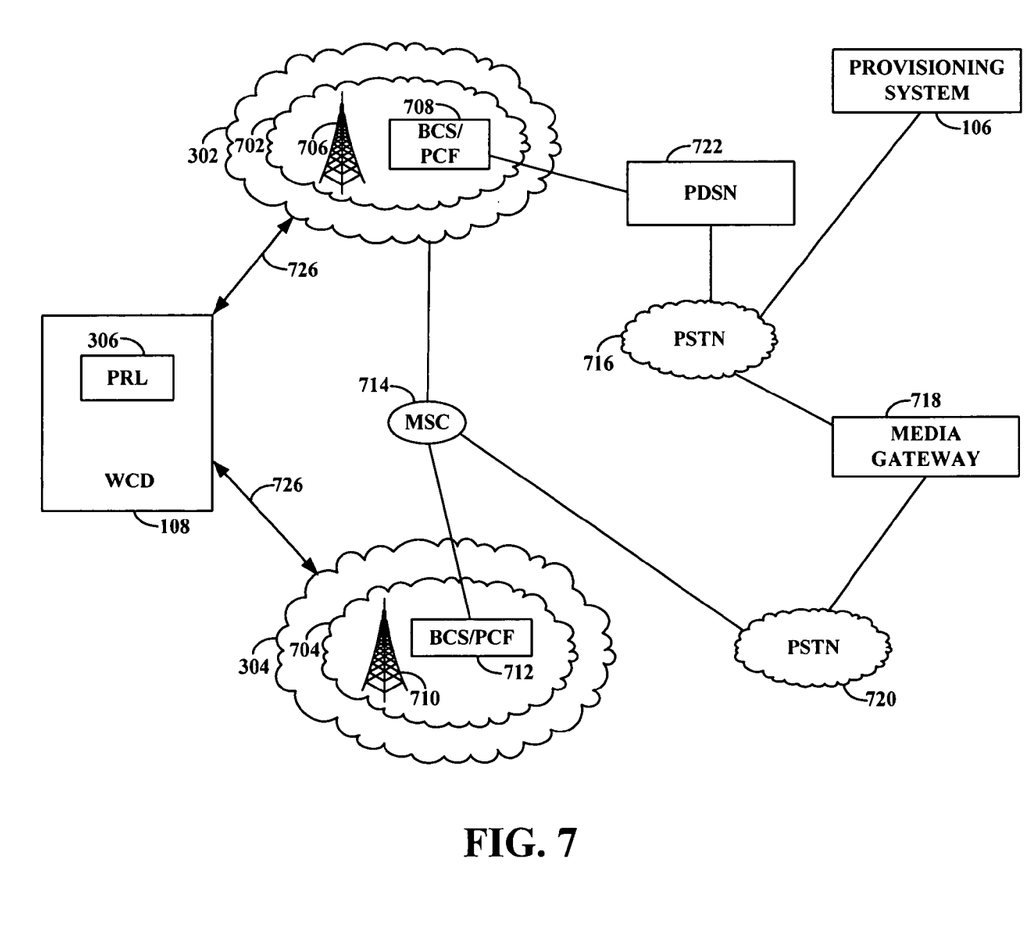
FIG. 7 is a simplified block diagram of an exemplary communication network, which may be used in accordance with exemplary embodiments.

FIG. 7 is a simplified block diagram of an exemplary communication network, which may be used in accordance with exemplary embodiments. As shown in FIG. 7, a communication network 700 includes communication system 302 and communication system 304 of FIG. 3. It should be understood that each of the communication systems 302 and 304 could take many forms, and that the arrangement shown in FIG. 7 is provided by way of example.

As shown in FIG. 7, communication network 700 includes WCD 108 provisioned with PRL 306 of FIGS. 3 and 6, air interfaces 724 and 726, communication system 302, communication system 304, a mobile switching center (MSC) 714, a packet data serving node (PDSN) 722, a packet data network (PDN) 716, a media gateway 718, a public switched telephone network (PSTN) 720, and provisioning system 106 of FIG. 1.

Communication system 302 includes a RAN 702, which comprises a base transceiver station (BTS) 706 and a base station controller/packet control function (BSC/PCF) 708 that communicates with WCD 108 over air interface 726. Communication system 304 includes a RAN 704, which comprises a BTS 710 and BSC/PCF 712 that communicates with WCD 108 over air interface 724.

BTS 706 comprises a tower with antennas that radiate to define air interface 726. BSC/PCF 708 communicates with WCD 108 over air interface 726 according to an air interface protocol such as cdma2000®. BTS 710 comprises a tower with antennas that radiate to define air interface 724. BSC/PCF 712 communicates with WCD 108 over the air interface 724 according to an air interface protocol such as EV-DO Rev. A. Air interfaces 724 and 726 may operate according to other air interface protocols. Examples of other air interface protocols are listed above in connection with FIG. 5.

BSC/PCF 708 and 712 are each communicatively linked to MSC 714, which functions as a switch to provide connectivity with other switches in PSTN 720. PSTN 720 may be the well known circuit-switched telephone network known as the Public Switched Telephone Network, and may be communicatively linked with at least media gateway 718 and MSC 714.

For providing data connectivity to WCD 108, BSC/PCF 708 is communicatively linked to PDSN 722, which communicates with PDN 716. PDN 716 may also be communicatively linked to media gateway 718 and one or more networking devices, such as provisioning system 106 of FIG. 1.

Media gateway 718 may be any networking device (such as a server) arranged to pass communication between PSTN 720 and PDN 716. As such, media gateway 718 may have one interface for communicating with PSTN 720 and another interface for communicating with PDN 716. Media gateway 718 may thus receive circuit-switched signaling and bearer communication from PSTN 720, convert those communications to a packet-based format, and transmit those communications to PDN 716. Likewise, media gateway 718 may receive packet-based signaling and bearer communications from PDN 716, convert those communications to a circuit-switched format, and transmit those communications to PSTN 720.

In the exemplary arrangement shown in FIG. 7, RAN 702 and RAN 704 may both connect to PSTN 720. Yet, while connecting to PSTN 720, both RANs may provide a different communication service to WCD 108. As an example, RAN 702 may connect to PSTN 720 by communicating to PDSN 722, which may communicate to PDN 716, and which may in turn communicate to PSTN 720 through media gateway 718. By connecting WCD 108 to PSTN 720 through PDN 716, RAN 702 can provide packet-switched voice service. RAN 704, however, may connect to PSTN 720 by communicating to MSC 714, which directly communicates to PSTN 720. In this instance, by connecting WCD 108 to PSTN 720 through MSC 714, RAN 704 can provide WCD 108 with circuit-switched voice service.

WCD 108 may be set up such that it prefers one communication system over another. The order in which WCD 108 attempts to connect with the communication systems may be dictated by PRL 306. As an example, PRL 306 may prefer RAN 702 over RAN 704. As another example, PRL 306 may allow WCD 108 to communicate with RAN 702 and may not allow WCD 108 to communicate with RAN 704.

Figure 8:
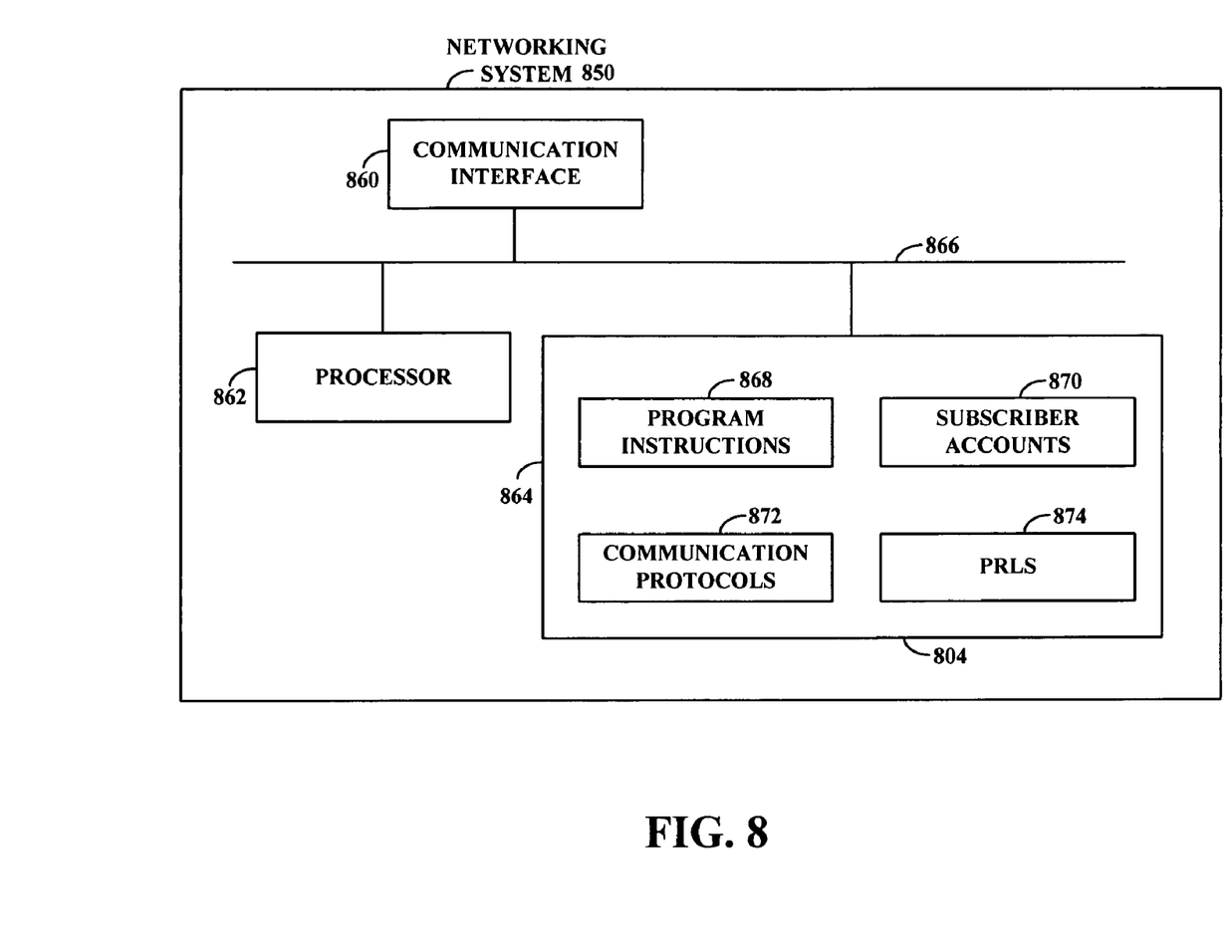
FIG. 8 is a simplified block diagram of an exemplary networking system, which may be used in accordance with exemplary embodiments.

Further, WCD 108 may be provisioned with PRL 306 using a networking system such as provisioning system 106, a possible structure of which is described more fully in connection with FIG. 8. In particular, FIG. 8 is a simplified block diagram of an exemplary networking system, which may be used in accordance with exemplary embodiments. FIG. 8 depicts a networking system 850, which may represent the inner structure of a system or a device. For example, networking system 850 may represent the inner structure of MSC 714, provisioning system 106, administrator system 104, and/or any other networking device or system described herein, any combination of which may be arranged and programmed to carry out the functions described herein. As shown in FIG. 8, networking system 850 includes a communication interface 860, a processor 862, and data storage 864, all of which may be communicatively linked by a system bus, or other communication link 866.

Networking system 850 may be set up in a variety of ways. As an example, subscriber accounts 870 and PRLs 874 may each be located in a different server, each of which may be communicatively linked to networking system 850. As another example, networking system 850 may be arranged and programmed to maintain a set of subscriber accounts 870 and PRLs 874 in data storage 864. Each of the subscriber accounts in subscriber accounts 870 may store personal subscriber information and data that associates the subscriber account with a WCD. Further, each of the PRLs in PRL's 874 may list communication systems according to different priorities and/or preferences.

Data storage 864 may store program instructions 868 to cause networking system 850 to (i) receive a request from a customer service representative 102 or an administrator system 104 to provision WCD 108, (ii) make a determination of whether WCD 108 is being provisioned under an existing subscriber account, or rather under a new subscriber account, (iii) identify a home service area of WCD 108, (iv) select a PRL based on the determination and/or identification, and/or (v) provision WCD 108 with the selected PRL.

Data storage 864 may also include a set of communication protocols 872 for use in communicating with one or more other devices of FIG. 7 or any other communication networks. Communication protocols 872 and may include any of the protocols listed above with respect to FIG. 5 or any other communication protocols.

IV. Exemplary Operation

Figure 9:
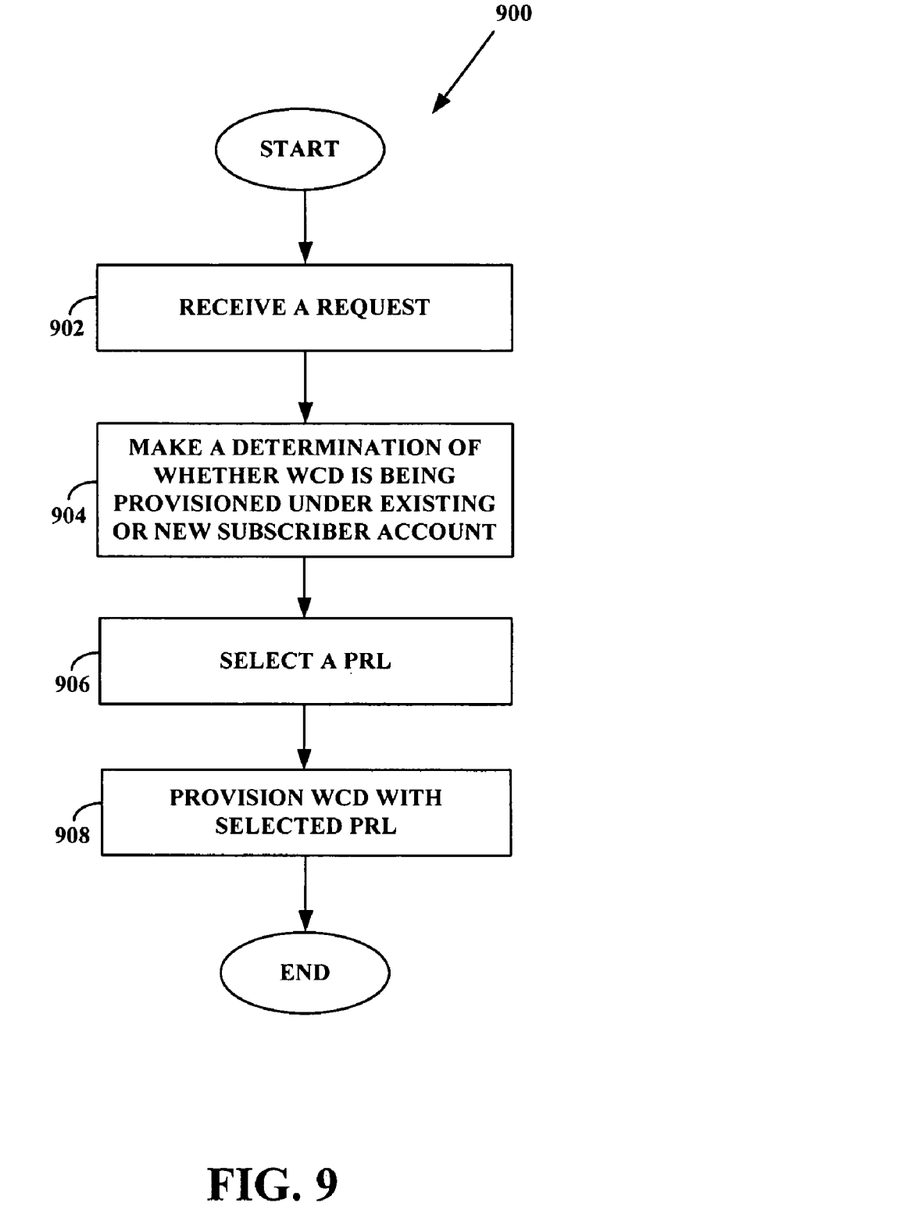
FIG. 9 is a flowchart of an exemplary embodiment, in the form of a method carried out along the communication network of FIG. 7.

FIG. 9 is a flowchart depicting a method of provisioning a WCD in accordance with an exemplary embodiment. Although described below as being carried out by provisioning system 106, as a general matter, it should be understood that method 900 could be carried out by any one or any combination of MSC 714, provisioning system 106, administrator system 104, and/or any other network device or devices. Further, it should be understood that that one or more steps of method 900 could be carried out over-the-air and/or through a direct cable connection. Still further, method 900 could be carried out a service center or at any location at which WCD 108 can communicate with provisioning system 106 using interface such as air interface 724.

As shown in FIG. 9, method 900 begins at step 902, when provisioning system 106 receives a request to provision WCD 108. As one example, the request may originate from a customer service representative 102 operating provisioning system 106 at a service center. Alternatively, the request may originate from a network device, such as administrator system 104, which may be programmed to send a request to provisioning system 106.

At step 904, provisioning system 106 makes a determination of whether WCD 108 is being provisioned under an existing subscriber account or rather under a new subscriber account. Provisioning system 106 may make this determination by accessing various sources of information. One possible source of information could be a subscriber server that stores subscriber account records. Another possible source could be a billing server that stores billing account records. Other sources of information may also exist.

In one embodiment, to carry out step 904, provisioning system 106 may access a subscriber account record and determine whether an ESN (e.g., representing a WCD) is associated with that subscriber account. If the subscriber account record does not indicate that an ESN is associated with the subscriber account, then the subscriber account may be deemed to be a new subscriber account. Alternatively, if the subscriber account record indicates that an ESN is already associated with the subscriber account, then the subscriber account may be deemed to be an existing subscriber account.

In accordance with the present embodiment, provisioning system 106 may access a subscriber account record and determine whether provisioning WCD 108 comprises performing an ESN-swap. An ESN-swap may be performed for an existing subscriber who is transferring existing cellular service from one WCD to another. If provisioning WCD 108 comprises activating a subscriber account record for which an ESN-swap was not performed, then the subscriber account may be deemed to be a new subscriber account. In this case, the subscriber account may not have an ESN associated with it. However, if provisioning WCD 108 comprises performing an ESN-swap, then the subscriber account may be deemed to an existing subscriber account. In such a case, the existing subscriber account may already have an ESN associated with it and the existing subscriber account will be updated to include a new WCD's ESN.

In another embodiment, at step 904, provisioning system 106 may access a subscriber account record and check an activation date for a subscriber account. The activation date may be the date on which a subscriber activated service for WCD 108 or for some other WCD. If the activation date for WCD 108 is before a certain date, then the subscriber account associated with WCD 108 may be deemed to be an existing subscriber account. However, if the activation date is after the certain date, then the subscriber account may be deemed to be a new subscriber account.

In yet another embodiment, at step 904, provisioning system 106 may access a subscriber account record and determine if the subscriber account record has a billing account associated with it. A plurality of subscriber account records may be associated with a single billing account. The billing account may be an account that facilitates payment—perhaps by credit card, automatic withdrawal, or mail—for services provided to subscriber account records associated with the billing account. If the subscriber account record does not have a billing account associated with it, then the subscriber account may be deemed to be a new subscriber account. However, if the subscriber account record has a billing account associated with it, then the subscriber account may be deemed to be an existing subscriber account. Step 904 may be carried out in many other ways which are not limited to accessing data and/or sources of information.

At step 906, provisioning system 106 selects a PRL based at least in part on the determination made at step 904. If the determination at step 904 is that WCD 108 is being provisioned under an existing subscriber account, then provisioning system 106 selects a first PRL. Alternatively, if the determination at step 904 is that the WCD 108 is being provisioned under a new subscriber account, then provisioning system 106 selects a second PRL.

The first PRL, for example, could define a preference for a first type of communication service over a second type of communication service and the second PRL could define a preference for the second type of communication service over the first type of communication service. As a more specific example, the first PRL could define a preference for circuit-switched voice service over packet-switched voice service, and the second PRL could define a preference for packet-switched voice service over circuit-switched voice service.

As another example, the first PRL could list a first type of communication system but not a second type of communication system, and the second PRL could list the second type of communication system but not the first type of communication system. The first type of communication system could be a system that provides circuit-switched voice service, while the second type of communication system could be a system that provides packet-switched voice service.

Still further, as another example, the first PRL could define a preference for legacy voice service over VoIP voice service, and the second PRL could define a preference for VoIP voice service over legacy voice service. Legacy voice service is herein defined as any communication service that does not use packet-switched voice service. The legacy voice service, for example, could be carried out using the CDMA2000 protocol, and the VoIP voice service could be carried out using the EV-DO Rev. A protocol. Many other examples are possible as well.

In some embodiments, in addition to the determination made by provisioning system 106 at step 904, provisioning system 106 may also identify a home service area of WCD 108. The home service area may be identified by a MIN that is associated with a subscriber's account. As an example, the MIN may have an area code number that corresponds to a certain geographical area in which service was activated for WCD 108. In those cases, provisioning system 106 may select a PRL based on the determination made at step 904 and on the identified home service area of WCD 108, as well as perhaps on one or more additional factors.

As an example, if VoIP voice service has been rolled out extensively in a given market, then a WCD having its home service in that market could be provisioned with a PRL that prefers VoIP over legacy voice service even if the handset is being provisioned under an existing subscriber account. On the other hand, if VoIP service has been rolled out only slightly in a given market, then a handset having its home service in that market could be provisioned with a PRL that prefers legacy voice service even if the handset is being provisioned under a new subscriber account.

At step 908, provisioning system 106 provisions WCD 108 with the selected PRL. As an example, this step could comprise transmitting the selected PRL to WCD 108 in an over-the-air-service-provisioning process, for storage of the selected PRL by WCD 108. As another example, this step could comprise loading the selected PRL onto WCD 108 through a direct cable connection. Once WCD 108 has been provisioned with the selected PRL, WCD 108 may then communicate according to communication systems and preferences listed in the PRL.

V. Conclusion

Exemplary embodiments of the present invention have been described above. Those skilled in the art will understand, however, that changes and modifications may be made to the embodiments described without departing from the true scope and spirit of the present invention, which is defined by the claims.

What is claimed is:

1. A method of provisioning a wireless communication device (WCD), the method comprising:

making a determination of whether the WCD is being provisioned under an existing subscriber account or rather under a new subscriber account, wherein, if provisioning the WCD comprises performing an ESN-swap, then making the determination that the WCD is being provisioned under an existing subscriber account, and if provisioning the WCD comprises initially activating a subscriber account, then making the determination that the WCD is being provisioned under a new subscriber account;

selecting a preferred roaming list (PRL) based at least in part on the determination, wherein if the determination is that the WCD is being provisioned under an existing subscriber account, then selecting as the PRL a first PRL, and if the determination is that the WCD is being provisioned under a new subscriber account, then selecting as the PRL a second PRL different than the first PRL, wherein the first PRL defines a preference for a first type of communication service over a second type of communication service, and wherein the second PRL defines a preference for the second type of communication service over the first type of communication service; and provisioning the WCD with the selected PRL.

2. The method of claim 1, wherein the first PRL defines a preference for legacy voice service over VoIP voice service, and wherein the second PRL defines a preference for VoIP voice service over legacy voice service.

3. The method of claim 2, wherein the legacy voice service comprises voice service under CDMA2000, and wherein the VoIP voice service comprises voice service under EV-DO Rev. A.

4. The method of claim 1, wherein the first PRL defines a preference for circuit-switched voice service over packet-switched voice service, and the second PRL defines a preference for packet-switched voice service over circuit-switched voice service.

5. The method of claim 1, wherein the first PRL lists a first type of communication system but not a second type of communication system, and the second PRL lists the second type of communication system but not the first type of communication system.

6. The method of claim 5, wherein the first type of communication system is a system that provides circuit-switched voice service, and the second type of communication system is a system that provides packet-switched voice service.

7. The method of claim 1, further comprising identifying a home service area of the WCD, wherein selecting the PRL based at least in part on the determination comprises selecting the PRL based at least in part on the determination and the identified home service area of the WCD.

8. The method of claim 1, wherein provisioning the WCD with the selected PRL comprises transmitting the selected PRL to the WCD in an over-the-air-service-provisioning process, for storage of the selected PRL on the WCD.

9. The method of claim 1, wherein provisioning the WCD with the selected PRL comprises loading the selected PRL onto the WCD at a service center of the WCD.

10. A method of provisioning a preferred roaming list (PRL) in a wireless communication device (WCD), the method comprising:

making a determination of whether provisioning the WCD comprises an ESN-swap or rather whether provisioning the WCD comprises activating a new subscriber account for the WCD;

if the determination is that provisioning the WCD comprises an ESN-swap, then provisioning the WCD with a PRL that defines a preference for communicating with a first type of system over communicating with a second type of system; and if the determination is that provisioning the WCD comprises activating a new subscriber account for the WCD, then provisioning the WCD with a PRL that defines a preference for communicating with the second type of system over communicating with the first type of system.

11. The method of claim 10, wherein the first type of system is a system that provides circuit-switched voice service, and the second type of system is a system that provides packet-switched voice service.

12. The method of claim 11, wherein the first type of system is a CDMA2000 system, and the second type of system is an EV-DO Rev. A system.

13. The method of claim 10, wherein the first type of system is a system that provides legacy voice service, and the second type of system is a system that provides VoIP voice service.

14. The method of claim 13, where in the legacy voice service comprises voice service under CDMA2000, and wherein the VoIP voice service comprises voice service under EV-DO Rev. A.

15. The method of claim 10, wherein provisioning the WCD with the PRL comprises transmitting the PRL to the WCD in an over-the-air-service-provisioning process, for storage of the PRL on the WCD.

16. The method of claim 10, wherein provisioning the WCD with the PRL comprises loading the selected PRL onto the WCD at a service center of the WCD.

* * * * *